(12) United States Patent
Haillot

(10) Patent No.: US 8,868,262 B2
(45) Date of Patent: Oct. 21, 2014

(54) METHOD FOR OPTIMIZING THE OVERALL ENERGY EFFICIENCY OF AN AIRCRAFT, AND MAIN POWER PACKAGE FOR IMPLEMENTING SAME

(75) Inventor: Jean-Michel Haillot, Beuste (FR)

(73) Assignee: Turbomeca, Bordes (FR)

( * ) Notice: Subject to any disclaimer, the term of this patent is extended or adjusted under 35 U.S.C. 154(b) by 0 days.

(21) Appl. No.: 13/817,183

(22) PCT Filed: Aug. 23, 2011

(86) PCT No.: PCT/FR2011/051943
§ 371 (c)(1),
(2), (4) Date: Feb. 15, 2013

(87) PCT Pub. No.: WO2012/025687
PCT Pub. Date: Mar. 1, 2012

(65) Prior Publication Data
US 2013/0151039 A1    Jun. 13, 2013

(30) Foreign Application Priority Data

Aug. 25, 2010    (FR) ..................................... 10 56761

(51) Int. Cl.
| | |
|---|---|
| *G06F 17/00* | (2006.01) |
| *G01C 23/00* | (2006.01) |
| *B64D 13/06* | (2006.01) |
| *B64D 41/00* | (2006.01) |
| *F01D 17/16* | (2006.01) |
| *F02C 7/32* | (2006.01) |
| *B64D 31/00* | (2006.01) |

(52) U.S. Cl.
CPC ................ *B64D 13/06* (2013.01); *B64D 41/00* (2013.01); *F01D 17/165* (2013.01); *F02C 7/32* (2013.01); *B64D 31/00* (2013.01); *B64D 2013/0611* (2013.01); *Y02T 50/53* (2013.01); *F05D 2220/50* (2013.01)
USPC ............................................................. 701/3

(58) Field of Classification Search
CPC ........... B64D 41/00; B64D 2013/0611; B64D 13/06; B64D 31/00; F01D 17/165; F02C 7/32; Y02T 50/53; F05D 2220/50
USPC ............................................................. 701/3
See application file for complete search history.

(56) References Cited

U.S. PATENT DOCUMENTS

| | | | |
|---|---|---|---|
| 3,965,673 | A | 6/1976 | Friedrich |
| 4,091,613 | A | 5/1978 | Young |

(Continued)

FOREIGN PATENT DOCUMENTS

| | | |
|---|---|---|
| EP | 0 738 655 | 10/1996 |
| EP | 1 630 099 | 3/2006 |

(Continued)

OTHER PUBLICATIONS

International Search Report Issued Feb. 20, 2012 in PCT/FR11/51943 Filed Aug. 23, 2011.

*Primary Examiner* — Mary Cheung
*Assistant Examiner* — Anne Mazzara
(74) *Attorney, Agent, or Firm* — Oblon, Spivak, McClelland, Maier & Neustadt, L.L.P.

(57) ABSTRACT

A method and system limiting specific consumption of an aircraft by matching sizing of a power supply to actual power needs of a cabin pressure control system. The method optimizes overall efficiency of energy supplied onboard an aircraft including, in an environment near the cabin, at least one main power-generating engine, sized to serve as a single pneumatic energy-generating source for the cabin and as an at most partial propulsive, hydraulic, and/or electric energy-generating source for the rest of the aircraft. The method minimizes power differential between a nominal point of the power sources when the sources are operating, and a sizing point of non-propulsive energy contributions of the sources when the main engine has failed, by equally dividing power contributions of the main engines and the main power generator under nominal operating conditions and in an event of failure of a main engine.

15 Claims, 3 Drawing Sheets

(56) References Cited

U.S. PATENT DOCUMENTS

| | | | |
|---|---|---|---|
| 4,684,081 A | 8/1987 | Cronin | |
| 5,860,283 A | 1/1999 | Coleman et al. | |
| 5,956,960 A | 9/1999 | Niggeman | |
| 6,283,410 B1 | 9/2001 | Thompson | |
| 2006/0174629 A1 | 8/2006 | Michalko | |
| 2006/0231680 A1 | 10/2006 | Derouineau et al. | |
| 2007/0271952 A1 | 11/2007 | Lui et al. | |
| 2009/0088063 A1 | 4/2009 | Schwarz | |
| 2011/0188989 A1 | 8/2011 | Judd | |

FOREIGN PATENT DOCUMENTS

| | | |
|---|---|---|
| EP | 1 860 026 | 11/2007 |
| EP | 1 918 202 | 5/2008 |
| WO | 98 48162 | 10/1998 |
| WO | 99 12810 | 3/1999 |
| WO | 2006 023981 | 3/2006 |

METHOD FOR OPTIMIZING THE OVERALL ENERGY EFFICIENCY OF AN AIRCRAFT, AND MAIN POWER PACKAGE FOR IMPLEMENTING SAME

TECHNICAL FIELD

The invention relates to a method for optimizing the overall efficiency of the energy supplied aboard an aircraft, this energy being propulsive or non-propulsive, as well as to a main power unit for implementing such a method.

The invention applies to the engine set of aircrafts, i.e. essentially to the engine set of airplanes (jet engines, turbojet engines, turboprops) as well as to the engine set of helicopters (turboshaft engine).

Typically, in an aircraft, the cabin which accommodates the passengers is air-conditioned and/or pressurized. An air inlet of the cabin is connected to an environmental control system ECS (initials for "Environmental Control System") which adjusts the air-flow rate, temperature and/or pressure in collaboration with a possible recirculating system between the ECS system and the cabin.

STATE OF THE ART

It is known how to recover energy between the air at the outlet of the cabin, which has high pressure and temperature—typically 0.8 bar and 24° C.—, and the air outside the aircraft, the pressure and temperature of which are substantially lower—typically 0.2 bar and −50° C.—. For instance, the U.S. Pat. No. 5,482,229 suggests increasing the temperature of the air coming from an outlet channel of the cabin by means of a heat exchanger fluxed by air circulating in a duct coming from an engine compressor of the aircraft and coupled with the ECS system of the cabin. The air coming from the cabin, which has been warmed up through the heat exchanger, then drives a turbine of a power conversion unit which supplies mechanical or electric energy to auxiliary equipments (pumps, supercharger, alternators, etc.), before being discharged outside the aircraft.

However such a conformation does not make it possible to use the exhaust air from the cabin in a reliable way. Indeed, the pressure of this air is regulated in the cabin at a certain level, for example at 0.8 bar, and the variations of pressure between the inside and the outside of the aircraft—for example 0.8 bar internally and 0.2 bar externally when the aircraft ascends or is at high altitude—lead to pressure drops and to intrusive phenomena: the regulation cannot be correctly made any more because the pressure in the cabin is higher than the initial regulation value and the pressure transients are unacceptable for the passenger ear. The air cannot correctly flow out any more because the turbine causes all the time back-pressures blocking the air at the outlet of the cabin. In these conditions, the turbine of the conversion unit cannot be operational any more, in particular during the transient phases of ascent to altitude and high altitude.

Furthermore, the heat exchanger is not operational any more on the ground when the cabin door is open. This architecture requires then a heat installation with an additional heat exchanger coupled with an outside air circuit.

Besides, in the event of a failure of an equipment driven by the conversion unit, the latter runs into overspeed.

Furthermore, the use of air coming from an engine compressor of the aircraft is disadvantageous in terms of energy balance, due to the loss in the pipes because of the distance between the heat exchanger and the engine outlet. Furthermore, the power supplied by the engines to the ECS system during takeoff is overestimated with regard to its energy requirements. The sizing point of the supply of power to the ECS system is actually determined at minimal speed of the HP (high-pressure) body of the main engine, so that it is always capable of supplying the sufficient power to the ECS system—even at idle speed—.

Generally, main engines are sized so that they are able to supply, from time to time, an important propulsive power, for example at takeoff of the aircraft, i.e. when the HP body is at high speed, while in the other phases they supply a medium propulsive power, indeed minimal, for example in descent, i.e. when the HP body runs at a low speed. Propulsive power relates essentially to the thrust supplied by the jet engines and to the mechanical power supplied by airplane turboprops and helicopter turboshaft engines. This oversizing of power supply is generally accompanied by a specific overconsumption, in all flight phases apart from the idle.

DISCLOSURE OF THE INVENTION

The invention aims precisely at limiting the specific consumption by matching the sizing of the power supply and the actual power requirements of the cabin ECS system and more generally of the aircraft, so as to remove the useless power supplies.

The invention also aims at supplying energy in a sufficiently reliable way to face the cases of aircraft failure which might induce overspeeds. Another purpose of the invention is to favour the association of a high number of non-propulsive energy-consuming means, in particular the electric, mechanical and/or hydraulic consumers, in order to keep in all flight phases a positive overall energy balance between energy supply and consumption with regard to the known conformations, in particular in transient phases. Furthermore, the present invention is going to make it possible to recover thermal energy on the outlet side of the cabin without any risk of back-pressure that is harmful to the regulation, with an optimized heat exchange.

To do this, the invention consists in supplying energy near the cabin outlet, in particular pneumatic energy to the cabin, by means of an engine-type power-generating means. A power-generating means is said to be of engine type when the architecture of this power-generating means is fit for the certification as engine usable during all flight phases, in the same way as a power-generating means serving as a main engine.

More precisely, the object of the present invention is a method for optimizing the overall efficiency of the energy supplied aboard an aircraft, this energy being propulsive or non-propulsive, the aircraft being equipped with a passenger cabin with regulated airflow, and with power sources including the main engines. Such an optimization consists in providing, in an environment located near the cabin, at least one engine-type main power-generating means sized so as to serve as single other pneumatic-energy generating source for the cabin and at most partly as other propulsive, hydraulic and/or electric energy-generating source for the rest of the aircraft, and in minimizing the power difference between the nominal point of the power sources when said sources are functioning and the sizing point of the non-propulsive energy contributions of said sources in a situation of failure of a main engine, namely by equally dividing the power contributions of the main engines and main power-generating means under nominal operating conditions and in the event of a failure of a main engine.

The main power-generating means makes it possible to adjust the supply of pneumatic energy according to the strict requirement of the cabin, whereas main engines needlessly supplied a power which was substantially higher than the bare minimum, typically twice higher: they have been oversized as far as the pneumatic-energy balance is concerned because their sizing is based on the minimal speed of the main engine HP body. The supply of pneumatic energy being not a matter for the main engines anymore according to the invention, they have a substantially improved efficiency and the overall efficiency also is then substantially improved.

Besides, the overall thermal efficiency of a main power-generating means that has been so sized is substantially equal to that of the main engines for the non-propulsive power supply, in descent phase or in nominal flight phase, typically of the order of 20%. An equally dividing of the amounts of electric power is then applied without any significant detriment to consumption. A contrario, in ascent phase, supply of electric energy by the main engines will be preferred because the efficiency of the main engines is higher due to the fact that the speed of the high-pressure body (HP) is higher than that of a main power-generating means.

Furthermore, the contribution of an additional main power-generating means offers a redundancy of engines means and thus strengthens the fault tolerance and the availability of the aircraft.

The invention also relates to a main power unit, hereinafter: MPU, capable of optimizing the overall energy efficiency according to the above method. Such a main power unit is based on a power unit of the auxiliary power unit type, in an abbreviated form: APU, which has been made more reliable, in order to belong to the engine category, and combined with an energy-recovery structure.

APUs usually fit aircrafts in order to feed the various energy-consuming equipments (electric, pneumatic and hydraulic power, air conditioning) on the ground, and start the main engines. When an engine is out of order, some APUs have been sufficiently secured so that they are able to start up again for trying to restart the failing engine during the flight and/or to supply part of the electric energy to the equipments in flight.

APUs typically consist of a gas generator—including at least an intake compressor, a combustion chamber and at least one power turbine—as well as means for driving the equipments (supercharger, fuel and hydraulic pumps, electric generator and/or electric starter/generator, etc.) directly or via a power-transfer box with rotational-speed adaptation. An air bleed at the outlet side of the supercharger or intake compressor is used for pneumatically starting the main engines.

The use of an APU, even secured, during all the flight phases to supply non-propulsive energy is considered as unrealistic because of an unfavourable energy efficiency in comparison with the main engines: operating an APU during the whole flight duration means additional fuel consumption.

Now, if the APU is converted into an engine-type power unit for permanently supplying pneumatic energy according to the strict requirement of the cabin, then an aircraft having such a unit offers a favourable balance.

As such, in an aircraft including energy-consuming equipments, in particular a cabin the air of which is renewed and the temperature and/or pressure of which are regulated by means of a regulation system ECS, main power-generating engines and a flight control unit, a main power unit according to the invention built into a compartment which is insulated from the other zones of the aircraft with a fireproof bulkhead and fitted with an outside-air intake and an exhaust nozzle, includes an engine-type power unit of the above described type fitted with a gas generator and with a power turbine for driving equipments including a supercharger. The supercharger is coupled, via a regulation control which communicates with the control unit, with the ECS system in order to supply the necessary pneumatic energy to the cabin.

According to particular embodiments:

the main power unit is coupled with a recovery structure including at least one energy-recovery turbine for driving the equipments with the power turbine and coupled, on the air-inlet side, with the outlet of the cabin to cool, on the air-outlet side, the equipments, the supercharger being built into this recovery structure as a supplier of pneumatic energy to the cabin;

the supercharger includes a variable-pitch air diffuser having blades, the adjustment of which is servo-controlled by the regulation control, capable of strictly adjusting the air flow to the supply of pressure and flow rate required by the ECS in every flight phase;

a variation in the setting of the diffuser of the supercharger results in a variation in the air-flow rate with a substantially constant pressure ratio: so, the balance between need and supply is met without significant wasting;

the supercharger is directly coupled with the power turbine to avoid any loss of energy due to a transfer of power other than a mechanical transfer;

the gas generator includes an intake compressor which can serve as a supercharger;

the recovery turbine is a turbine, preferably centripetal, with variable-pitch guide vane assembly having blades the orientation of which is servo-controlled by the regulation control;

at least one pressure sensor regulates the opening and closing of the blades of the diffuser and guide vane assembly in connection with the servo-control;

the recovery turbine ejects, on the outlet side, an air flow into the compartment of the main power unit which, after it has cooled the equipments and auxiliary equipments contained in the aft compartment, is evacuated into the exhaust nozzle by a jet pump action resulting from the efflux velocity of the hot air flow coming out of the power turbine;

the recovery turbine is coupled with a soundproofing device in order to avoid the propagation of the wind noises into the cabin;

the most open possible setting positions can go beyond full opening into radial position, i.e. the so called zero position;

a regulation of the variable setting, between full opening on the ground and progressive closing of the air flow while gaining altitude, can be automated by means of the regulation control according to the pressurization in the cabin.

Generally, the fact was taken into account that the loss of energy supply capacity of the main unit, which increases with height, should be at least partially compensated in flight by an optimization of the positions of the variable settings of the recovery turbine in the most closed position compatible with back-pressures at the outlet side of the cabin and of the supercharger in the most open possible position.

The level of thermodynamic power compatible with the in-flight stresses for the main unit is minimized: even if, on the ground, the appropriate positions of the variable settings penalize the efficiency of the recovery turbine and supercharger, the main power unit the thermodynamic power of which has been sized in that way is then capable of supplying enough energy on the ground. So, optimizing efficiency in flight was preferred. In the whole flight envelope, the overall efficiency of the compressor and recovery turbine is thus optimal thanks to the presence of a diffuser and/or a guide vane assembly with variable settings.

According to other advantageous embodiments:

means for transmitting power from the power and recovery turbines to the mechanical, pneumatic, hydraulic and/or electric equipments of the aircraft are provided, in particular in the form of a power-transfer box;

the recovery structure comprises a heat exchanger having two heat-transfer circuits: a primary circuit connected, on the inlet side, with the hot-air-flow outlet of the power turbine and, on the outlet side, with the exhaust nozzle; and a secondary circuit connected, on the inlet side, with an air-flow outlet of the cabin and, on the outlet side, with the recovery turbine;

the variable-pitch guide vane assembly of the recovery turbine, coupled with means of regulation, is capable of orienting the air flow coming from the heat exchanger, in particular during transient phases of the aircraft as well as at altitude—transient phases relating to the phases of takeoff, ascent, descent and landing—.

In these conditions, energy recovery on the outlet side of the cabin—in the form of pressure and/or temperature—is optimized thanks to the proximity to the main power source, while ensuring an air outflow on the outlet side of the cabin with a controlled back-pressure in the cabin. Besides, connecting the energy recovery means to a main power-generating source, and not to a mere compressor or an alternator, makes it possible to absorb overspeeds that can start in the event of a failure thanks to the inertia resulting from the mass effect due to the components of the power-generating source and all the consumers.

Furthermore, recovering energy on the outlet side of the cabin can be undertaken by supplementing the potential energy contained in the air outflow from the cabin by thermal energy used to cool systems dedicated to aircraft equipments before being further enriched by heat exchange between the aforementioned air flows.

BRIEF DESCRIPTION OF THE DRAWINGS

Other aspects, characteristics and advantages of the invention will appear in the following non-restrictive description of particular embodiments, in reference to the accompanying drawings which show respectively.

DETAILED DESCRIPTION OF EMBODIMENTS

In all the Figs., identical or similar elements having the same function are identified with identical or related reference marks.

Figure 1:
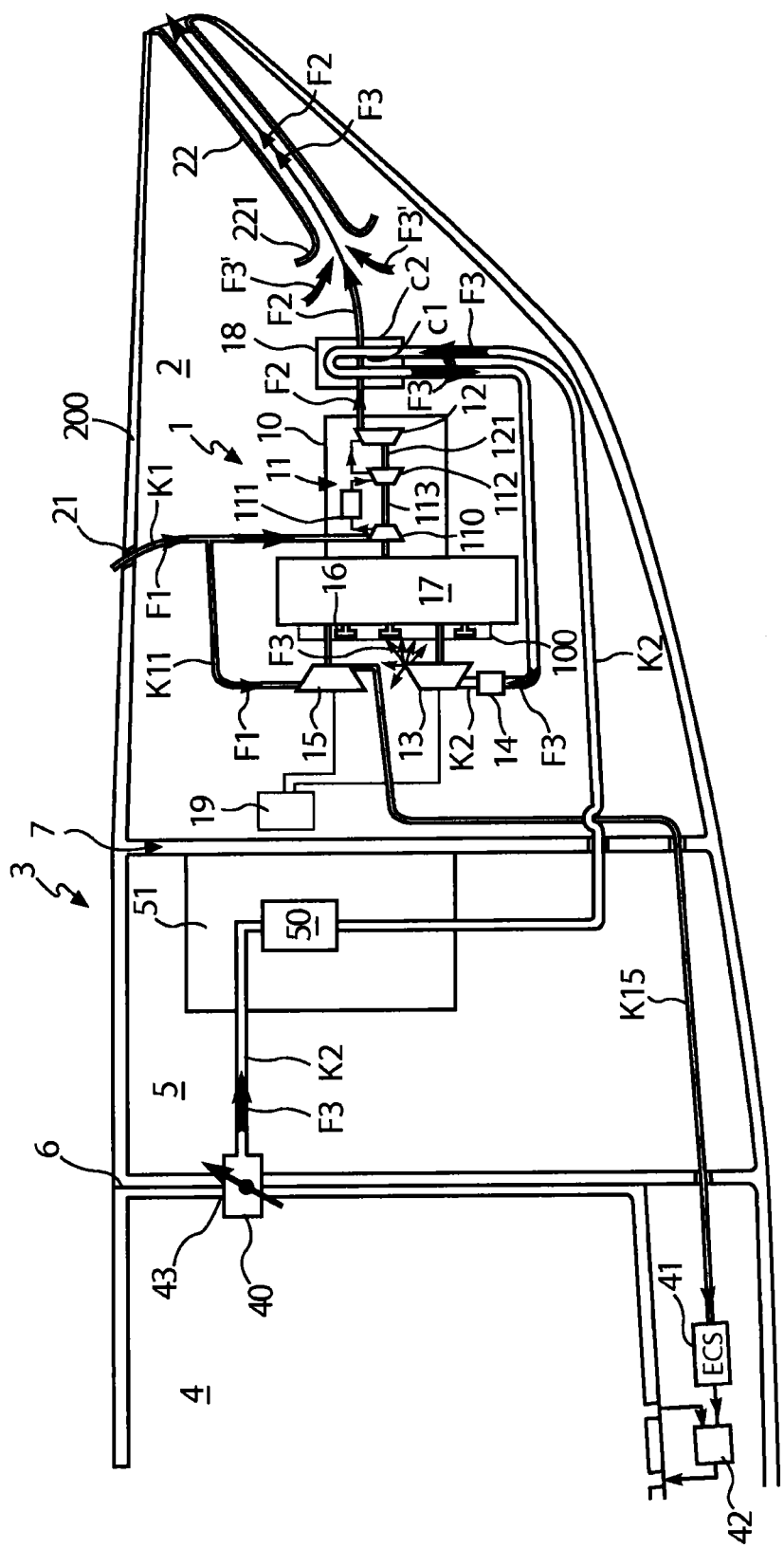
in FIG. 1, a diagram of an example of a main power unit according to the invention in an aircraft aft compartment, in connection with an aircraft cabin fitted with an environmental control system ECS.

In reference to FIG. 1 showing a schematic diagram, a main power unit 1 is arranged in an aft compartment 2 situated in the downstream part of the aircraft 3. The passenger cabin 4 is situated upstream and coupled with the aft compartment 2 via an intermediate compartment 5. A pressure bulkhead 6 separates the cabin 4 from the intermediate compartment and a fireproof bulkhead 7 insulates the intermediate compartment 5 from the aft compartment 2, which is fitted with an outside-air intake 21 and an exhaust nozzle 22.

The main power unit 1 includes an engine 10, of the APU type but of the engine category, combined with an energy-recovery structure. The auxiliary engine consists of: a gas generator or HP body 11, including an intake compressor 110 for an air flow F1 coming from the air intake 21; a combustion chamber 111; and a turbine 112 for driving the compressor 110 by means of a HP shaft 113. This gas generator is coupled, on the inlet side, with an air-flow duct K1 mounted on the outside-air intake 21 and, on the outlet side, with a power turbine 12 which produces a hot air flow F2, typically of about 500 to 600° C.

The energy-recovery structure is centred on a recovery turbine 13 in connection with a soundproofing device 14, in order to avoid the propagation of the wind noises outside the compartment, in particular into the cabin.

This recovery turbine 13 is coupled with the power turbine 12 for driving equipments 100—mechanical, pneumatic (compressors), electric (alternators) and/or hydraulic (pumps)—especially a supercharger 15 and a starter/generator 16, via a power-transfer box 17 in the example. This box 17 is fitted with gearboxes and bevel gears (not shown) suitable for power transmission. The power turbine 12 supplies its power to the box 17 via a shaft 121, i.e. a through-going shaft in the illustrated example. Alternatively this shaft can be a non-through-going shaft or an outside shaft via an appropriate box of reduction (not shown). This box is advantageously fitted with a freewheel intended for its disconnection in the non-recovery phases (for example in the case of an open airplane cabin door).

The supercharger 15 supplies an environmental control system, called ECS system, 41 of the cabin 4 with air and transfers to it, via a recycling mixing valve 42, compressed air coming from the outside-air intake 21 through a branch K11 of duct K1. The supercharger 15 is regulated by a regulation control 19 which communicates with the control unit (not shown) so as to supply the necessary pneumatic energy to the cabin. As a variant, the intake compressor 110 can serve as a supercharger 15 by appropriately bleeding air.

At least one variable valve 40, called cabin-pressure-regulation valve, circulates air flow F3 from the outlet 43 of the cabin 4 to the energy-recovery structure via duct K2. Advantageously, duct K2 goes into the intermediate compartment 5 so that air flow F3 cools the power electronics 50 inside a cabinet 51—these auxiliary equipments being dedicated to various systems made for the functioning of the aircraft (landing gear, etc.), which, of course, are non-operational when the cabin door is open—. At the outlet of the compartment 5, air flow F3 has a temperature about 40° C. The variable-pitch guide vane assembly can advantageously replace the pressure-regulation valves at the cabin outlet.

The recovery structure comprises, in this example, a heat exchanger 18 fitted with a primary circuit C1, connected, on the inlet side, with the outlet of hot air flow F2 and, on the outlet side, with the nozzle 22—the temperature of flow F2 being then typically reduced from ca. 550° C. to 300° C.—and with a secondary circuit C2 connected, on the inlet side, with air flow F3 coming from the cabin 4 and, on the outlet side, to the recovery turbine 13. Flow F3 has then a temperature substantially higher than at the inlet (approximately 40° C.), for example of the order of 150° C. At the outlet of the recovery turbine 13, air flow F3 is dispersed in the aft compartment 2 in order to cool the equipments 100 (down to approximately 40° C.) and then collected in the form of flow F3', by reflection on walls 200 of the compartment, into the nozzle 22. Collection takes place because of a jet pump action, at the widened intake 221 of this nozzle, resulting from the efflux velocity of hot air flow F2, coming from the power turbine 12, at the outlet of the heat exchanger 18.

Figure 2:
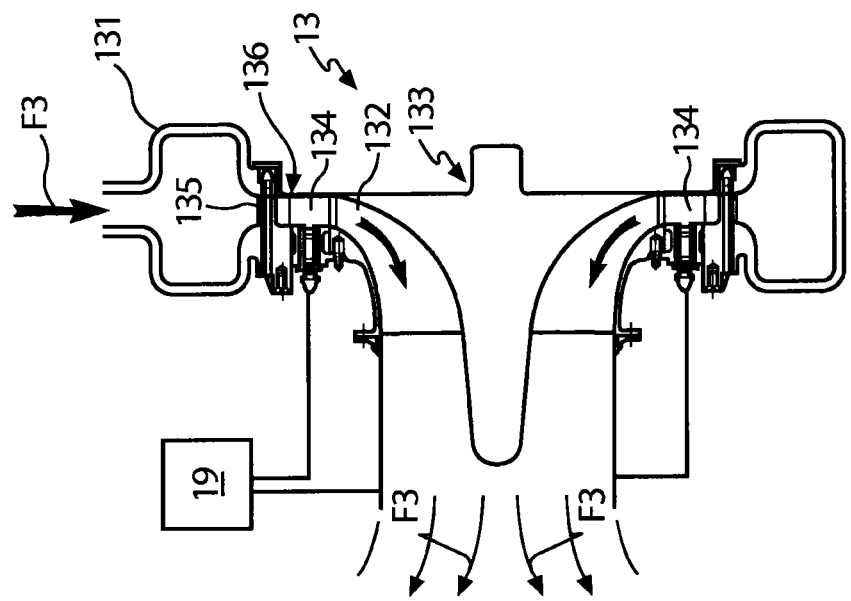
in FIG. 2, a schematic sectional view of an example of a MPU centripetal recovery turbine provided with a variable-pitch guide vane assembly.

The recovery turbine 13 is explained in detail in reference to the schematic sectional view of FIG. 2. The recovery turbine is a centripetal turbine fitted with a ring chamber 131 for bringing in air (flow F3). This air is then directed by the variable-pitch guide vane assembly 136. The turbine 133 has a stator blading 132. Outlet-side air flow F3 is acoustically processed and distributed in the aft compartment 2 so that it controls the temperature of the equipments 100 and other non-shown auxiliary equipments (fire, jacks, etc.). Alternatively, other types of turbines can be used: axial or reaction-impulse (inclined).

The guide vane assembly 136 is composed of variable-pitch mobile blades 134 which guide and accelerate the air flow coming from the heat exchanger 18. These blades have a variable pitch and their orientation is adjusted by the regulation control 19 during the transient phases of the aircraft as well as at altitude. In operation, a pressure sensor 135 regulates the opening and closing of the blades 134 of the guide vane assembly 132 in collaboration with control 19.

Figure 3:
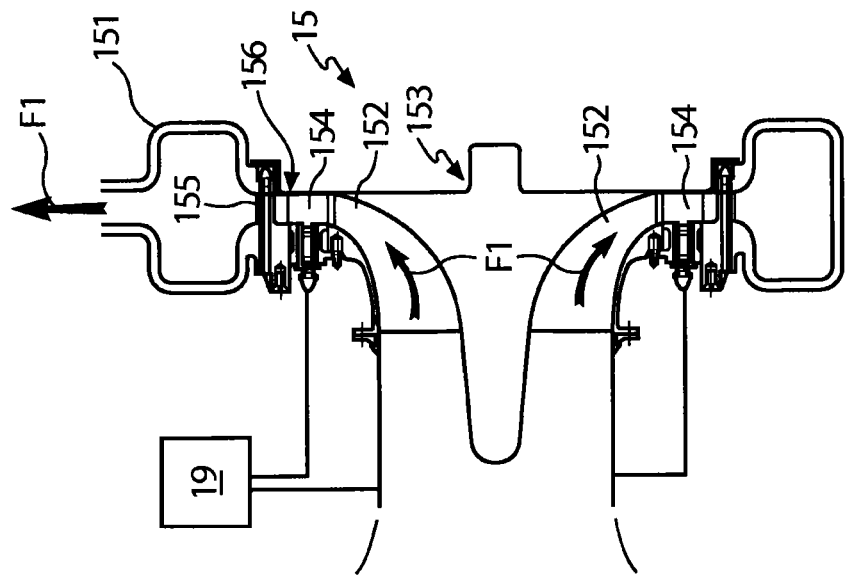
in FIG. 3, a schematic sectional view of an example of a MPU supercharger provided with a variable-pitch guide vane assembly, and in FIG. 4, a graph of the power supplied to an aircraft, according to the thermal efficiency of the power sources, on which the nominal point and the sizing point are shown.

The supercharger 15 is explained in detail hereinafter in reference to the schematic sectional view of FIG. 3. This supercharger has a structure which is similar to that of the recovery turbine but inverted with regard to the circulation of air flow F1: ring chamber 151—variable diffuser 156 with mobile blades 154—and a centrifugal compressor 153 fitted with fixed blades 152. The variable-pitch mobile blades 154 are piloted by the regulation control 19, in particular during the transient phases and at altitude. A pressure sensor 155 regulates the orientation of the blades 154 via the control 19 in order to meet the characteristics defined by the ECS system, namely an air-flow rate 151 adjusted to the required supply of pressure and flow rate (arrow F1).

In a concrete example, the pneumatic-power need for the ECS system of a standard airplane is typically 180 kW. A main engine is sized to supply these 180 kW at idle speed whereas in normal operation it produces 360 kW in the quasi-totality of the flight phases. A main power unit according to the invention is thus sized to supply the 180 kW of pneumatic power that are strictly sufficient to meet the needs of the ECS system.

The power supply by the main power unit according to the invention is not limited to the supply of pneumatic energy. This unit can indeed supply power to the HP body of the main engines via the starter/generator 16 used as an electric generator coupled with the starter/generator of the main engines used in driving mode.

So, with a global need for power of typically 420 kW—i.e. 180 kW of pneumatic power for the ECS system, 60 kW of hydraulic power for the jacks and 180 kW of electric power for the alternators, pump, etc.—the use of a supercharger, a recovery turbine and/or a heat exchanger according to the recovery structure of the invention makes it possible to substantially lower the loss of energy which would be generated by the exclusive use of main engines to carry out these functions. For instance, a supercharger with a variable-pitch diffuser makes it possible to save 180 kW, a variable-pitch recovery turbine typically 90 kW and a heat exchanger from 15 to 20 kW, i.e. 285 to 290 kW altogether. The main engines contribute then only one third to the total of these power supplies (420 kW), pneumatic power excepted (180 kW), i.e. approximately 80 kW, that is to say a substantially lower supply than that of the main power unit which supplies, in this example, 150 kW (70 kW plus one third of the remaining 240 kW, i.e. 80 kW, to supply pneumatic and electric/hydraulic energy respectively).

Considering an efficiency of the main power unit (typically 20%) which is similar to that of a main engine in the flight phases other than ascent or failure of one of the engines and lower than that of the main engine (40%) in full use (ascent or the other engine out of order), an equally dividing of the supply of energy between the engines, whether it is a main engine or the main power unit, makes it possible to optimize the overall efficiency covering all the flight phases, under nominal operating conditions or in the event of a failure: for example, the equally dividing of the supply of hydraulic and electric power is ⅓, ⅓, ⅓ for two main engines and a main power unit in operation, and ½, ½ in the event of a failure of a main engine.

Figure 4:
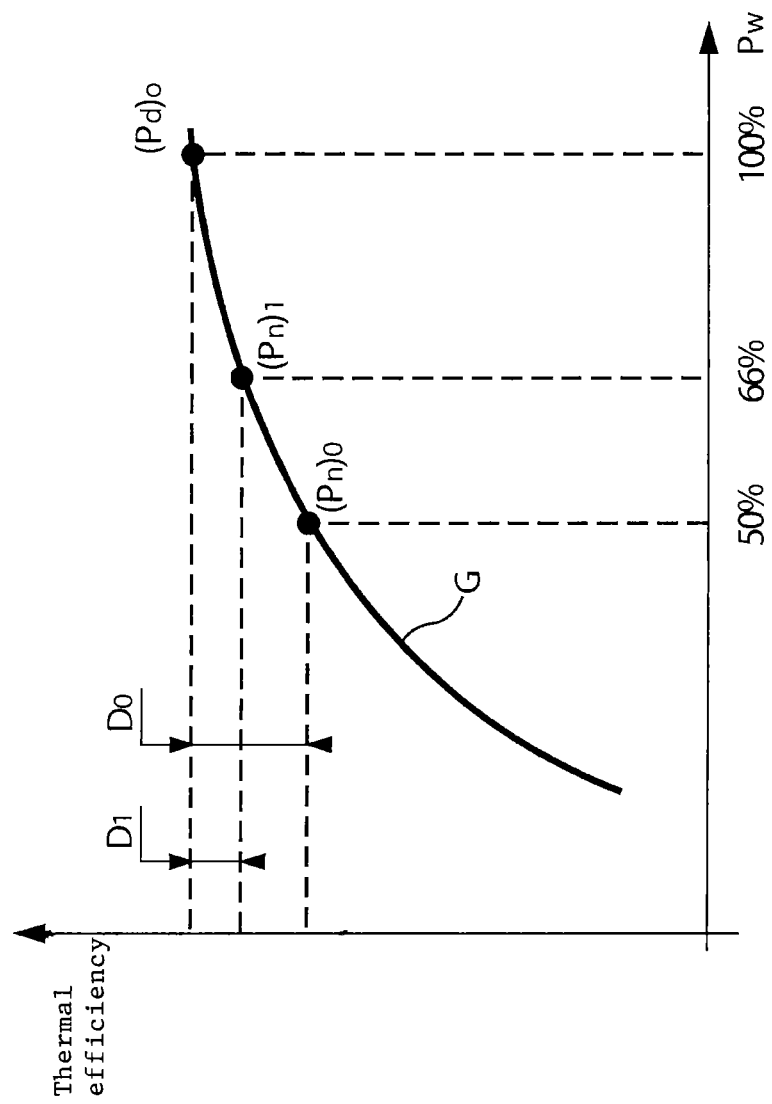

Furthermore, the equally dividing makes it possible to optimize the efficiency of all the power sources forming a turbine engine as shown, in FIG. 4, by the graph G representing the variation in the thermal efficiency dependent on the power Pw supplied by an engine. On this graph, we can see:
  the power sizing point (Pd)0 of the turbine engine: this sizing point is established in the most severe conditions of need for power (generally in the case of failure of an engine or a particularly difficult takeoff);
  the nominal point (Pn)0 of the turbine engine without the main power unit, and the nominal point (Pn)1 of the turbine engine with the main power unit with equally dividing;

The variation in the thermal efficiency related to the consumption of fuel is optimized when the turbine engine includes the main power unit, namely for the following reasons. Without main power unit, efficiency variation D0 between points (Pn)0 and (Pd)0 is higher than variation D1 between points (Pn)1 and (Pd)0 when the aircraft includes a main power unit, but with substantially lower amounts of power supplied. This situation is the expression of the optimization obtained with the equally dividing by minimizing the difference between the nominal point and the sizing point. Indeed, the first D0 corresponds to the transition from 50 to 100% (corresponding to 200% to be supplied in the event of a failure) of power supplied by an engine going from nominal conditions to sizing conditions, i.e. a difference of 50%. The second variation D1 corresponds to the transition from 33% (more exactly ⅓) to 50% in order to go from the first type to the second type of conditions. With a main power unit, the turbine engine shows a decrease of the power to be supplied of ⅓, i.e. 33% for all the main engines, with an overall efficiency (corresponding to the efficiency variation) increased by the difference (D0−D1). This example does not take into account the possibility of load shedding which can be applied to the cases of failure. Whether with or without load shed, the efficiency is improved.

The above statement refers to the functioning of a main power unit. The case of failure of this unit has not been evoked but, should that arise, it is of course possible to provide for other emergency equipments which can substitute for this unit, for instance in degraded mode, in particular: at least one of the two main engines which will then supply an additional power, or a spare APU or equivalent, or a combination of these sources.

Besides, the equally dividing which is evoked in the present statement implies that the power sources have been conceived to enable such an equally dividing in the set out conditions. The statutory constraints and physical stresses, in particular mechanical, to be taken into account generally make it only possible to strive as far as possible towards the ideal conditions for equally dividing.

The invention claimed is:

1. A method for optimizing overall efficiency of energy supplied aboard an aircraft, the energy being propulsive or non-propulsive, the aircraft including a passenger cabin with regulated air flow, and power sources including at least two main engines, the method comprising:
providing, in an environment located near the cabin, at least one main engine-type power-generating unit sized to serve as a single other pneumatic energy-generating source for the cabin and at most partly as an other propulsive, hydraulic, and/or electric energy-generating source for a rest of the aircraft; and
minimizing a power difference between a nominal point of the power sources when the power sources are functioning and a sizing point of non-propulsive energy contributions of the power sources in a situation of failure of a main engine;
wherein the minimizing includes
dividing the power under nominal operating conditions equally between the at least two main engines and the main engine-type power generating unit, and
dividing the power in the event of the failure of the main engine equally between at least one main engine and the main engine-type power generating unit.

2. A main power unit in an aircraft, comprising:
energy-consuming equipments;
a cabin in which air is renewed and temperature and/or pressure of which is regulated by a regulation system;
at least two main power-generating engines;
a flight control unit; and
an engine-type power unit including a gas generator and with a power turbine for driving equipments including a supercharger, the supercharger being coupled, via a regulation control that communicates with the control unit, with the regulation system to supply necessary pneumatic energy to the cabin, the engine-type power unit being built into a compartment which is insulated from other zones of the aircraft with a fireproof bulkhead and including an outside-air intake and an exhaust nozzle,
wherein power sources include the at least two main engines and the engine-type power unit,
wherein the flight control unit is configured to minimize a power difference between a nominal point of the power sources when the power sources are functioning and a sizing point of non-propulsive energy contributions of the power sources in a situation of failure of a main engine, and
wherein minimizing the power difference includes dividing a power under nominal operating conditions equally between the at least two main engines and the engine-type power unit, and dividing the power in the event of the failure of the main engine equally between at least one main engine and the engine-type power generating unit.

3. The main power unit according to claim 2, coupled with a recovery structure that includes at least one energy-recovery turbine for driving the equipments with the power turbine and that is coupled, on an air-inlet side, with an outlet of the cabin to cool, on an air-outlet side, the equipments, the supercharger being built into this recovery structure as a supplier of pneumatic energy to the cabin.

4. The main power unit according to claim 3, in which the recovery turbine ejects, on an outlet side, an air flow into the compartment of the main power unit which, after it has cooled the equipments and auxiliary equipments contained in an aft compartment, is evacuated into an exhaust nozzle by a jet pump action resulting from efflux velocity of hot air flow coming out of the power turbine.

5. The main power unit according to claim 3, in which the recovery turbine is a centripetal turbine with a variable-pitch guide vane assembly including blades in which adjustment of which is servo-controlled by the regulation system.

6. The main power unit according to claim 3, further comprising means for transmitting power from the power and recovery turbines to mechanical, pneumatic, hydraulic, and/or electric equipments of the aircraft.

7. The main power unit according to claim 6, in which the power-transmission means is in a form of a power-transfer box.

8. The main power unit according to claim 3, in which the recovery structure comprises a heat exchanger including two heat-transfer circuits of: a primary circuit connected, on an inlet side, with a hot-air-flow outlet of the power turbine and, on an outlet side, with an exhaust nozzle; and a secondary circuit connected, on the inlet side, with an air-flow outlet of the cabin and, on the outlet side, with the recovery turbine.

9. The main power unit according to claim 2, in which the supercharger includes a variable-pitch air diffuser including blades, adjustment of which is servo-controlled by the regulation control, configured to strictly adjust air flow to a supply of pressure and flow rate required by the regulation system in every flight phase.

10. The main power unit according to claim 9, in which a variation in setting of the diffuser of the supercharger results in a variation in an air-flow rate with a substantially constant pressure ratio.

11. The main power unit according to claim 9, in which at least one pressure sensor regulates opening and closing of the blades of the diffuser and a guide vane assembly in connection with the regulation system.

12. The main power unit according to claim 11, in which a most open possible setting position of the blades can go beyond full opening into a radial position, at a zero position.

13. The main power unit according to claim 11, in which a regulation of the variable setting of the blades, between full opening on the ground and progressive closing of air flow while gaining altitude, is automated by the regulation system according to pressurization in the cabin.

14. The main power unit according to claim 2, in which the supercharger is directly coupled with the power turbine.

15. The main power unit according to claim 2, in which the gas generator includes an intake compressor capable of serving as the supercharger.

* * * * *